Figure 1:
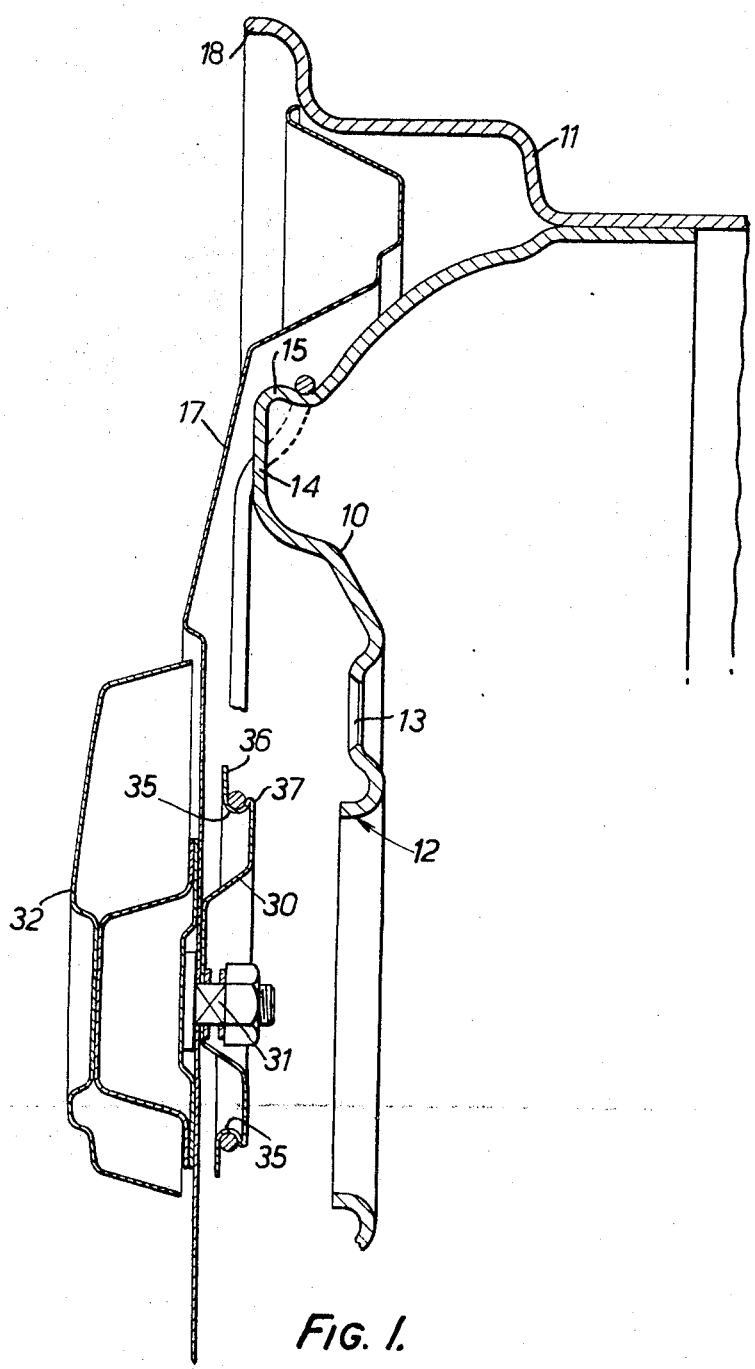

United States Patent
Crompton

[15] 3,663,065
[45] May 16, 1972

[54] WHEEL TRIMS OR WHEEL COVERS

[72] Inventor: Geoffrey Crompton, Alderminster, near Stratford-upon-Avon, England

[73] Assignee: Pressweld Limited, Gloucester, England

[22] Filed: Aug. 1, 1969

[21] Appl. No.: 846,906

[30] Foreign Application Priority Data

Aug. 6, 1968 Great Britain......................37,532/68
Nov. 1, 1968 Great Britain......................51,779/68

[52] U.S. Cl. .........................................................301/37 R
[51] Int. Cl..............................................................B60b 7/06
[58] Field of Search...........................................301/37, 108

[56] References Cited

UNITED STATES PATENTS

| | | | |
|---|---|---|---|
| 3,480,329 | 11/1969 | Foster.......................................301/37 |
| 2,073,851 | 3/1937 | Powell............................301/108 UX |
| 2,819,929 | 1/1958 | Hunt......................................301/108 |
| 2,843,427 | 7/1958 | Vaughn..............................301/37 SC |
| 2,969,257 | 1/1961 | Lyon...................................301/37 SC |
| 2,935,360 | 5/1960 | Lyon...................................301/37 SC |

FOREIGN PATENTS OR APPLICATIONS 816,695 5/1937 France..................................301/108

*Primary Examiner*—Richard J. Johnson
*Attorney*—Young & Thompson

[57] ABSTRACT

A detachable wheel trim for a vehicle wheel, having anchorage hooks for attachment to the wheel, operable from the external side of the trim. In one form three anchorage hooks are connected to a triangular arrangement of three resilient steel links fitting over a triangular cam connected to a rotary knob on the external surface of the trim, so that by rotating the knob and the cam the three links are bent outwardly to cause a resilient inward force to be applied to each hook, alternatively the three links may be combined into a continuous hoop, and the rotary triangular cam may be replaced by an axially movable cam. Two or more pairs of parallel links may be used instead of a triangular system and in place of a cam the links may be operated by levers connected to a rotary or axially movable central shaft connected to the external knob.

7 Claims, 12 Drawing Figures

PATENTED MAY 16 1972

3,663,065

SHEET 2 OF 5

INVENTOR
GEOFFREY CROMPTON
BY Young + Thompson
ATTORNEYS

INVENTOR
GEOFFREY CROMPTON
BY
ATTORNEYS

PATENTED MAY 16 1972

3,663,065

SHEET 5 OF 5

INVENTOR
GEOFFREY CROMPTON
BY Young & Thompson
ATTORNEYS

WHEEL TRIMS OR WHEEL COVERS

This invention relates generally to wheel trims, that is to say covering devices, usually with a decorative appearance, designed to be attached to the outer side of a vehicle wheel, especially an automobile wheel. Wheel trims of various kinds are used almost universally on automobile wheels. In one well known type the wheel trim comprises a central dish-shaped cap of smaller diameter than the wheel itself and designed to cover the wheel securing nuts and the hub or grease cap if provided. This type of wheel trim is commonly known as a knave plate and is usually formed as a steel pressing arranged to be engaged over lugs or spigots formed on the wheel; to mount the knave plate it is usually necessary to position it properly and deliver a heavy blow causing the steel rim of the plate to spring and snap into position. To remove the knave plate a prising-off tool is needed.

Another common form of wheel trim comprises a relatively large diameter circular disc having a number of outwardly turned sharped claws formed around its periphery, designed to engage against a cylindrical flange part of the wheel adjacent to the rim of the wheel. Wheel trim discs of this type are normally formed with concentric circular corrugations, to provide resilience, and as in the case of a knave plate considerable force and usually a number of sharp blows of a heavy instrument are needed to position them on the wheel, while a prising-off tool is needed to detach them.

Another common form of wheel trim comprises an annular decorative member designed to occupy at least the greater part of the space between a central knave plate and the outer rim of the wheel. Such annular trims may be anchored to the wheel by an external claw fitting around the periphery, as in the case of the wheel trim discs, or may be held in position by a knave plate or the equivalent which overlaps part of the annular disc.

Known forms of wheel trim suffer from a number of disadvantages. In many cases considerable force is required to position the wheel trim members on the wheel and to free them when required; where sharp claw members are used these tend to scour the surfaces of the wheel which they engage so that rust forms; if the wheel trim member is designed to grip the wheel by its own natural resilience it is usually necessary to employ a material such as steel or stainless steel having adequate elasticity, and such materials are expensive and cannot easily be pressed with good definition to provide some of the decorative finishes found desirable; additionally some forms of wheel trim tend to become insecure after a period of use.

Accordingly it is an object of the present invention to provide an improved wheel trim which will overcome some or all of the disadvantages of known trims.

From one aspect the invention consists in a wheel trim including a cover member and anchorage means for holding the cover member, preferably detachably, in position on the wheel, the anchorage means including two, three, or more gripping members adapted to engage lugs, spigots, rims, or other anchorage surfaces on the wheel, locking means for holding the gripping members in their engaged positions, and means for attaching the cover member to the gripping members.

From another aspect the invention consists in a wheel trim including a cover member and anchorage means for holding the cover member, preferably detachably, in position on a wheel, the anchorage means being operable from the outer side of the cover member for movement between a locked and an unlocked position.

From a further aspect the invention consists in a wheel trim including a cover member and anchorage means for holding the cover, preferably detachably, in position on a wheel, and the anchorage means being separately formed from the cover member, and attached or attachable thereto.

From yet another aspect the invention consists in a wheel trim including a cover member, anchorage means for holding the cover member, preferably detachably, in position on a wheel, and locking means for actuating the anchorage means, the locking means being operable from the outer side of the cover member by pivotal or rotary movement about an axis parallel to the wheel axis, or longitudinally in the direction of the axis.

According to a preferred feature of the invention the anchorage means comprises two, three, or more gripping members, angularly spaced around the wheel axis and adapted to engage part of, or on, the wheel, and means for applying generally radial movement or thrust to the gripping members.

In a particularly convenient arrangement gripping members are attached to thrust links or tension links, and the apparatus includes means for varying the thrust or tension therein. For example the device may include means for resiliently deforming the thrust or tension links.

According to another preferred feature of the invention the anchorage means includes a cam device, for moving or applying an operating force to gripping members of the anchorage means.

Preferably the anchorage means includes a number of generally chordal links interconnecting gripping members, and non-circular cam means shaped to engage the chordal links, whereby on rotation of the cam means the links are distorted to apply radial forces to the gripping members.

According to another preferred feature of the invention the cover member is attached to locking means for the anchorage means, whereby bodily movement of the cover member (e.g. rotation thereof) causes the locking means to actuate the anchorage means.

In some arrangements the cover member is permanently attached to at least part of the anchorage means, (e.g. the locking means thereof). In other arrangements the cover member may be detachable from the anchorage means, and the device includes fastening means, accessible from outside the cover member, for holding the cover member to the anchorage means.

The invention also consists in a vehicle wheel incorporating a wheel trim in any of the forms defined.

Figure 2:
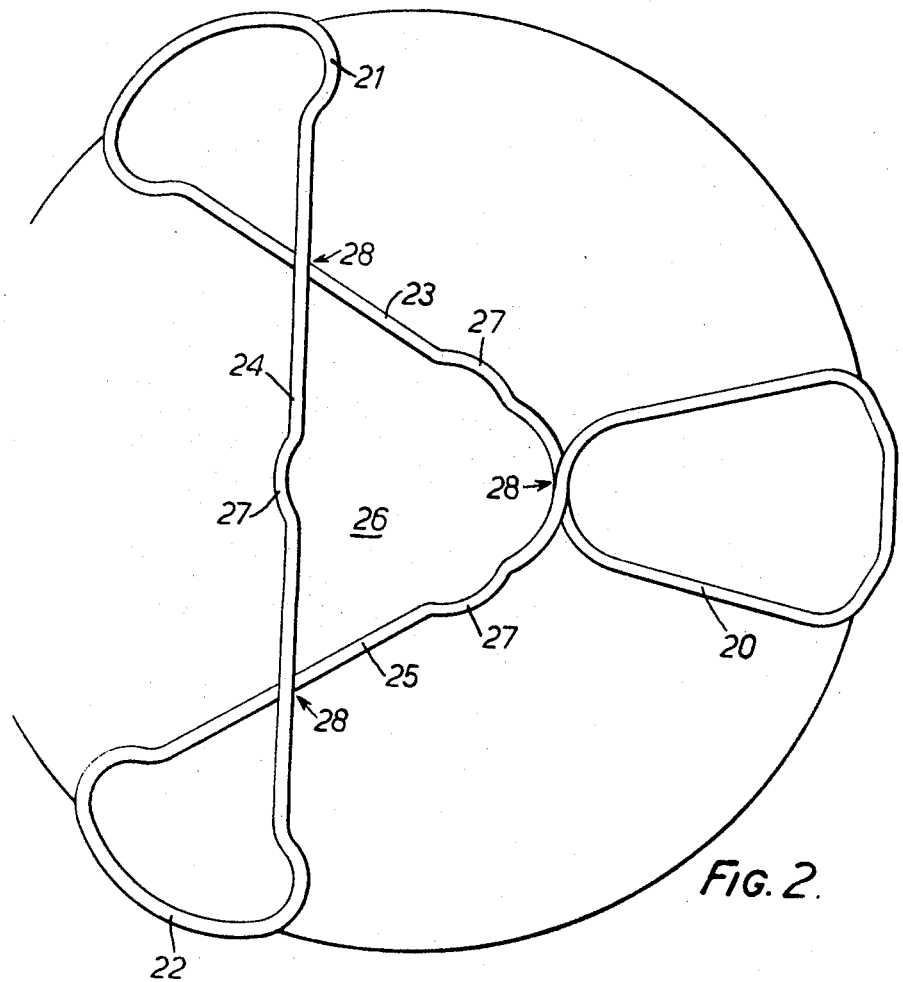
Figure 3:
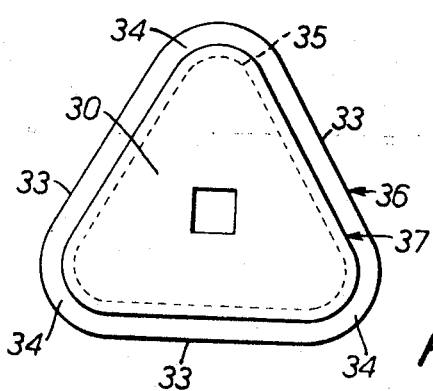
Figure 4:
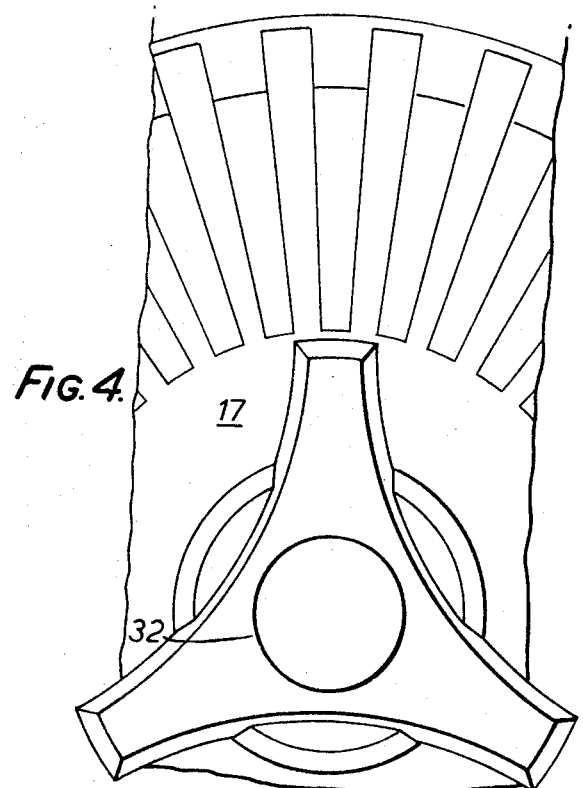
Figure 5:
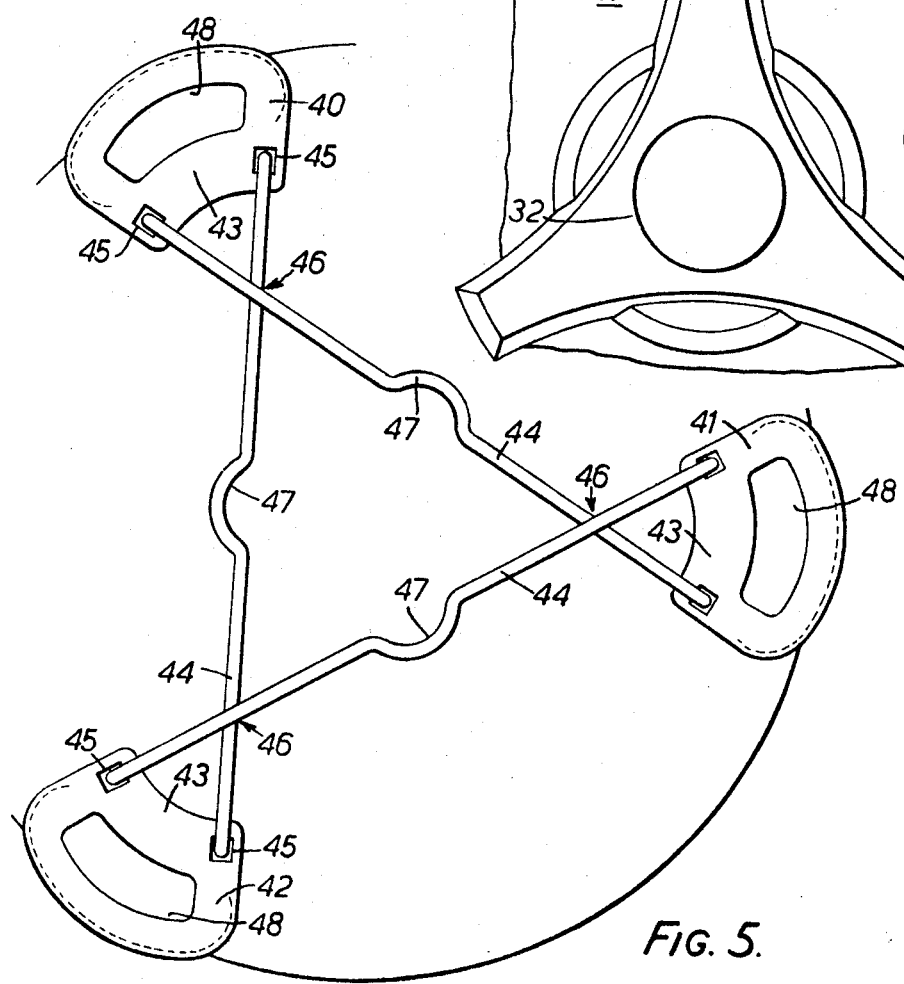
Figure 6:
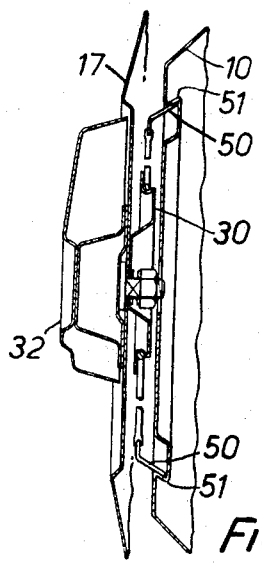
Figure 7:
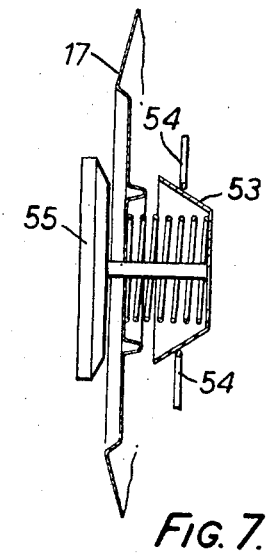
Figure 8:
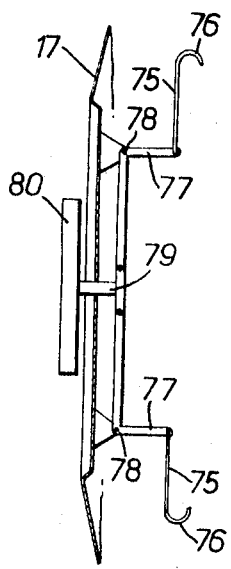
Figure 9:
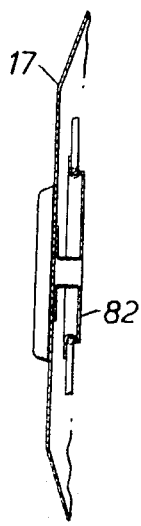
Figure 10:
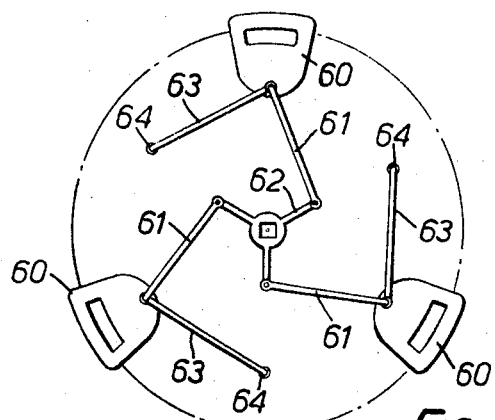
Figure 11:
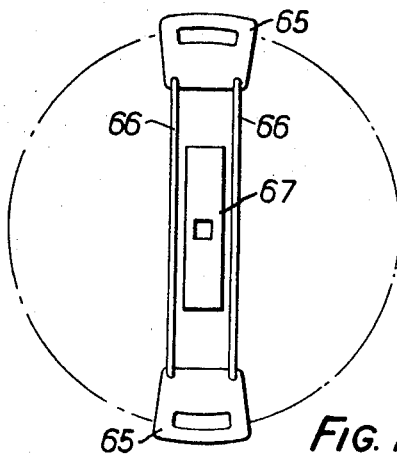
Figure 12:
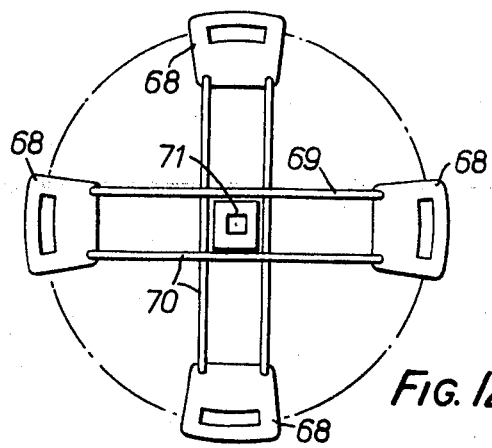

The invention may be performed in various different ways and a number of embodiments with possible modifications will now be described by way of example with reference to the accompanying drawings, in which FIG. 1 is a partial vertical section through the upper part of a vehicle wheel, with a wheel trim assembly according to the invention in position thereon, FIG. 2 is a front view of a triangular wire frame-work forming part of the anchorage for the wheel trim of FIG. 1, FIG. 3 is a rear view of the triangular rotary cam which cooperates with the frame-work of FIG. 2 to lock the wheel trim onto the wheel, FIG. 4 is a partial front view of the wheel trim disc of FIG. 1 showing the central operating handle, FIG. 5 is a front view, corresponding to FIG. 2 of a modified form of triangular wire frame-work with gripping claws, FIG. 6 is a diagrammatic partial vertical section through a modified form of wheel trim and anchorage device, in position on a vehicle wheel, FIGS. 7, 8, and 9 are diagrammatic partial vertical sections through three further alternative wheel trim anchorages according to the invention, and FIGS. 10, 11, and 12 are front views of three further anchorage systems for wheel trims in accordance with the invention.

In the first example illustrated in FIGS. 1 – 4 the wheel trim is designed to be applied to a conventional automobile wheel of the type including a central wheel disc 10 secured at its periphery to a channel shaped circular flange 11 in which the tire (not shown) is located. The disc has a central aperture 12 to locate over the central hub or grease cap of the wheel, and a series of holes 13 spaced around the wheel axis to locate over the usual wheel securing studs mounted on the wheel brake drum. Around these wheel stud apertures 13 the disc is provided with an outwardly projecting annular shoulder 14 and on the radially outer surface of this shoulder there are formed three angularly spaced noses, or lugs 15, as normally provided to receive and locate the peripheral edge of a knave plate.

The wheel trim in this example comprises a cover member 17 formed as a thin sheet aluminum pressing of relatively large diameter to cover substantially the whole of the wheel and extending radially up to but just short of the rim 18 thereof. This pressing 17 is not designed to act as part of the anchorage means and can therefore be formed of any ductile lightweight metal or alloy; the cover disc can thus be readily pressed to give any desired decorative appearance with high definition.

In this example the anchorage means comprises a triangular steel wire framework as shown in FIG. 2, formed from a continuous loop, and providing three gripping hoops 20, 21, 22 equally spaced at 120° intervals, designed to fit over the lugs 15 on the wheel disc. The three hoops are interconnected by three chordal links 23, 24, 25 each extending from one hoop to the next, and arranged to cross over each other at positions 28 thus defining a central triangular space 26, and the parts of the links which define this triangular space are each formed with an outwardly bowed part 27 for a purpose to be described. The shape and dimensions of these gripping hoops and interconnecting links are such that the gripping hoops can be readily positioned over the noses on the wheel, by simple manipulation or by applying a light pressure or tap, and will then hold themselves temporarily in position.

In conjunction with the triangular framework of links and gripping hoops illustrated in FIG. 2 a locking and fastening device is attached to the trim disc, comprising a generally triangular rotary cam element 30 (see FIG. 3) lying on the inner side of the trim disc 17, and connected by a squared bolt 31 passing through a hole at the center of the disc to a three-cornered locking handle or knob 32 on the outer surface of the disc, (see FIGS. 1 and 4). The cam element has three flat sides 33 and rounded corners 34 and is formed with a groove 35 extending around its periphery, dimensioned to engage and securely locate the anchorage links 23, 24, 25. The dimensions of the triangular cam 30 are such that when properly positioned it can be inserted in the axial direction of the wheel into the triangular space 26 enclosed between the three chordal links of the wire framework.

In use the triangular anchorage device (which is separate from the wheel trim disc) is first attached temporarily to the wheel as described above, with the gripping loops 20, 21, 22, hooked over the three noses 15 on the wheel. The trim disc 17 carrying the triangular cam 30 on its inner side is then brought up to the wheel with the cam aligned angularly in relation to the triangular anchorage structure. The groove 35 around the triangular cam has an outer annular flange 36 of greater radial depth than the inner flange 37 of the groove so that it is not possible to press the cam inwardly beyond a position in which the chordal links engage in the groove around the cam. When so positioned the external knob 32 is then simply turned so that the rounded corners 34 of the triangular cam swing towards the sides of the triangle formed by the chordal links 23, 24, 25. In doing so the links are resiliently deformed radially outwardly, thus applying tensile forces between each gripping hoop and the other two gripping hoops, along the links. This provides in effect a generally radial inward force on each gripping hoop which thus tightly engages and locks on the respective nose 15. When the cam has been rotated through 60° the rounded corners 34 of the cam engage in the bowed central parts 27 of each of the chordal links, which thus act as detents to hold the cam in this locked position.

To remove the wheel trim it is merely necessary to rotate the external knob 32 through approximately 60° so that the rounded corners 34 of the triangular cam move off the straight sides of the chordal links: the trim disc 17 can then be removed, after which the triangular anchorage device can itself be easily slipped off the noses 15 on the wheel.

In the possible modifications illustrated in FIG. 5 the gripping members are formed not by hoops integral with the chordal links 23, 24, 25, but by three hooked-shaped gripping members 40, 41, 42 each having a curled lip designed to engage over one of the noses 15 on the wheel and each having a flat plate portion 43 designed to lie in the general plane of the wheel disc. The plate portion of each gripping member is formed with two spaced apertures 45 and the three chordal links are separate interconnecting resilient steel rods 44 with hooked ends engaging in these apertures 45. The rods cross over each other at points 46 spaced inwardly from the hooks 40, 41, 42, and each rod has a central bowed part 47, for the same purpose as parts 27 in FIG. 2.

It will be understood that the gripping members (20, or 40) may be designed to engage a variety of different locating elements on the wheel. For example instead of noses 15 as shown in FIG. 1 the wheel may be provided with outwardly projecting headed spigots, and for this type of wheel the gripping members may alternatively or additionally be formed with slots or apertures such as 48 in FIG. 5, or hooks to engage over the spigots. It is also possible, though not normally desirable, that the gripping members may be arranged as hooks to engage over the actual rim 18 of the wheel, that is to say the rim of the channel flange 11 which locates the tire. Such arrangements however present certain problems and are probably not of general utility.

In the examples described above the triangular cam member 30 is permanently attached to the trim disc 17, and is rotated by means of the external handle or knob 32. In another possible modification (not illustrated) the cam is detachable from the trim disc, and fastening means, such as a screw or bolt passing through the trim disc, are provided for subsequently attaching the trim disc to the cam, when the cam has been located and locked in position within the triangular anchorage frame, as described.

In the examples referred to above it is assumed that the gripping members (20, 40) are drawn radially inwards into their locked positions. In some arrangements according to the invention the locking arrangement may be reversed, that is to say the gripping members are urged generally radially outwards into their locked positions. One such construction is illustrated diagrammatically in FIG. 6, in which parts corresponding to those in FIG. 1 to 3 are indicated by the same reference numerals. A similar triangular anchorage framework may be used for this purpose, with a similar triangular operating cam 30, but in such an arrangement the movement of the cam to distort the chordal links 23, 24, 25 will tend to draw the gripping members 50 radially inwards, that is to say into their unlocked or free positions: the gripping members 50 will be urged outwards into their locked positions engaging in a groove 51 in the wheel disc, by the natural resilience and dimensions of the parts.

In the examples described above the cam members 30 is designed for rotation about the axis of the wheel. In the modification illustrated in FIG. 7 the cam member 53 may be designed as a tapered plug or the equivalent, to be moved parallel to the axis of the wheel within the triangular anchorage frame-work 54, to expand or contract this framework and thus apply the necessary radial forces to the gripping members, (not shown) in substantially the same manner. In this example the axially movable cam 53 is connected to an external axially movable operating knob 55, but alternatively the central part of the trim disc 17 may be bodily movable with the cam 53, for which purpose the disc may be formed with a number of concentric corrugations to increase its natural resilience.

In the further modification of the invention illustrated in FIG. 10 the gripping members 60 are not directly interconnected by chordal links but are each attached by a pivoted link 61 to a multi-armed rotary spider 62 positioned centrally between the gripping members. Swinging links 63, pivotally attached at 64 to the trim disc are also provided for preventing the gripping members 60 from moving bodily about the axis, and the spider 62 is connected by a bolt passing through the trim disc to an external rotary actuating member such as a handle or knob (not shown). Thus rotary movement of the handle will cause each gripping member 60 to be drawn radially inwards, the radial dimensions of the arms of the spider 62 being considerably less than the radial distances from the gripping 60 members of the wheel axis.

It is preferred in most instances to use three gripping members equally spaced angularly about the wheel axis, but in some instances it may be satisfactory or preferred to adopt two, four or some other number of gripping members. FIG. 11 illustrates an anchorage system with two gripping members 65 interconnected by two parallel pivoted resilient wire links 66 spaced apart to provide a rectangular space in which is mounted a generally rectangular or oval rotary cam 67. Rotation of this cam about the wheel axis will cause the links 66 to be separated or distorted thus applying generally radial inward tensile forces to the two gripping members 65. In FIG. 12 four gripping members 68 are provided, cross-connected in pairs, each with a pair of parallel generally diametral links 69, 70, defining a central square space, in which a generally square rotary or linear cam 71 is mounted. Rotation of this cam through 45°, or linear axial movement thereof, will distort and stress the two pairs of links 69, 70, to draw all four gripping members 68 radially inwards into their locked positions. Similarly for other numbers of gripping members the links may be arranged to form a polygon, interconnecting the gripping members between one and the next, or as a series of pairs of spaced diametral links as in the examples illustrated in FIGS. 11 and 12 having two or four gripping members.

In the further modification of the invention illustrated in FIG. 8 the gripping members are in the form of radial links 75 with outer hooks 76, or slots, to engage over appropriate parts of the wheel, the inner ends of the radial links 75 being attached to bell-cranked levers 77, each pivotally mounted at a central point 78 on a tangential axis to a relatively fixed structure 79 fixed to the wheel trim disc. One arm of each bell crank lever 77 extends generally axially and is connected to the inner end of the respective link 75, and the other arm extends radially inwards and is pivotally connected to an axially movable operating shaft 79 passing through a central aperture in the wheel trim disc and connected to an external operating knob 80.

In the further embodiment illustrated in FIG. 9, which operates in a manner somewhat similar to the example of FIGS. 1 - 3, the rotary cam member 82 is fixed to the wheel trim disc 17, and no external operating knob or handle is provided. The necessary rotation of the triangular cam is obtained by rotating the whole wheel trim disc after the cam has been initially positioned in alignment with the triangular anchorage frame-work, which is similar to that of FIG. 2 or FIG. 5. In this example it may be necessary to provide an elongated arcuate slot in the wheel trim disc 17 to receive the valve of the tire and permit the necessary angular movement of the trim disc.

It will be understood that the trim or cover member 17 may if required be of relatively small diameter, resembling a knave plate, and in all cases it is preferred to provide resilient detent means to hold the anchorage system in its locked position until deliberately released.

The invention permits the actual trim cover member to be formed quite separately from the anchorage means and locking devices. The trim disc can therefore be formed of a light alloy such as aluminum, which is extremely cheap by comparison with stainless steel, and can more readily be pressed with good definition to give any required decorative appearance or finish. The parts of the device which provide the anchorage effect can then readily be formed of other suitable materials, having the necessary resilience, strength, hardness, and wear resistance. For example the interconnecting chordal links in the embodiments described may be formed of spring steel, and the locking cam may be formed as a moulded synthetic plastics unit. It will also be noted that in the embodiments described the rotary cam (30 in FIG. 1) with the groove 35 around its periphery, acts not only to interconnect the trim disc 17 with the gripping members, but also to distort the interconnecting links to hold the gripping members tightly in position. In some arrangements these two functions may be separated; for example the cam may be provided with simple triangular section cam surfaces to distort the chordal links, and have independent means for holding the cam attached to the anchorage frame-work.

In order to discourage pilfering the external operating knob, lever, or handle, may be replaced by an operating element which can only conveniently be operated by a special tool. For example there may be a smoothed faced circular spigot with a socket to receive a square section key, or some other special tool.

The trim disc 17 may in some cases be formed of a synthetic plastics material, since it is not required to act as a structural member in the anchorage means. In such cases the plastics trim disc may be moulded as an integral unit with a resilient plastics cam element or locking device for actuating the gripping members in one or other of the methods described above.

What is claimed is:

1. A wheel trim including a cover member and anchorage means for holding the trim in position on a wheel, the anchorage means including a number of generally chordal resilient links interconnecting gripping members arranged to engage anchorage surfaces on the wheel, and non-circular rotary cam means mounted inside and centrally of the cover member, rotatably from outside the cover member between locking and non-locking positions, and shaped to cammingly engage the chordal links, whereby on rotation of the cam means the links are distorted to apply radial forces to the gripping member, the links being adapted to retain the cam means in the locking position.

2. A wheel trim according to claim 1, in which the anchorage means is separable from the cover member.

3. A wheel trim according to claim 1, in which the radial forces are inwards.

4. A wheel trim according to claim 1, in which the radial forces are outwards.

5. A wheel trim according to claim 1, in which the gripping members are integrally formed with the links.

6. A wheel trim according to claim 1, in which the gripping members are formed as separate members and attached to said links.

7. A wheel trim according to claim 1, in which the cam means is rigid with said cover member which rotates therewith when the cam means is turned between the locking and non-locking positions.

* * * * *